US005558770A

United States Patent [19]

Cope et al.

[11] Patent Number: 5,558,770

[45] Date of Patent: Sep. 24, 1996

[54] CENTRIFUGAL SEPARATOR HAVING A CONE FRUSTUM

[75] Inventors: Dewey M. Cope; Thomas J. Magrecki, both of St. Louis, Mo.

[73] Assignee: Elgin National Industries, Inc., St. Louis, Mo.

[21] Appl. No.: 497,975

[22] Filed: Jul. 3, 1995

[51] Int. Cl.[6] .................... B01D 33/00

[52] U.S. Cl. .................... 210/374; 210/377; 210/380.1; 210/369; 494/36; 494/52; 494/67

[58] Field of Search .................... 210/360.1, 380.1, 210/369, 374, 377; 494/36, 43, 45, 60, 66, 50–52, 64, 67, 5

[56] References Cited

U.S. PATENT DOCUMENTS

| | | | |
|---|---|---|---|
| 1,334,023 | 3/1920 | Elmore . | |
| 1,342,743 | 6/1920 | Elmore . | |
| 1,664,769 | 4/1928 | Chance . | |
| 1,903,795 | 4/1933 | Rigler . | |
| 1,961,226 | 6/1934 | Keatley et al. . | |
| 2,043,662 | 6/1936 | Howe . | |
| 2,370,353 | 2/1945 | Howe . | |
| 2,727,631 | 12/1955 | Pate . | |
| 2,752,043 | 6/1956 | Van Riel . | |
| 3,074,842 | 1/1963 | Strong . | |
| 3,289,843 | 12/1966 | Nyrop . | |
| 3,315,810 | 4/1967 | Humphrey et al. . | |
| 3,361,264 | 1/1968 | Quetsch . | |
| 3,411,631 | 11/1968 | Elsken et al. . | |
| 3,438,501 | 4/1969 | Oyen . | |
| 3,837,913 | 9/1974 | Hillebrand et al. . | |
| 4,157,966 | 6/1979 | Hassall . | |
| 4,186,097 | 1/1980 | Dudley et al. . | |
| 4,718,945 | 1/1988 | Schaper et al. . | |
| 4,922,625 | 5/1990 | Farmer . | |
| 4,951,722 | 10/1990 | Taylor et al. | 210/380.1 |
| 5,256,289 | 10/1993 | Cope et al. | 210/380.1 |

*Primary Examiner*—David A. Reifsnyder
*Attorney, Agent, or Firm*—Paul M. Denk

[57] ABSTRACT

A cone frustum is provided for a centrifugal separator to shield the area of the separator's screen at the top of the flight assembly from the initial impact of the material which is introduced into the separator. The cone frustum is spaced above the flight assembly and below the inlet to shield the portion of the screen that is at the top of the flight assembly. The cone frustum is spaced radially inwardly from the screen and outwardly from the outlet. The cone frustum shields the part of the screen which wears most quickly to extend the life of the separator's screen assembly. The cone frustum is partially perforated to allow for initial dewatering of the material introduced into the separator. The slope of the cone frustum is equal to or less than the slope of the screen of the separator.

8 Claims, 3 Drawing Sheets

CENTRIFUGAL SEPARATOR HAVING A CONE FRUSTUM

BACKGROUND OF THE APPLICATION

The invention relates to centrifugal separators, and in particular to improvements in vertical centrifugal separators which extend the useful life of the screen of the separator, thereby reducing downtime of a separator and decreasing its maintenance.

As is well-known, centrifugal separators are widely used in a variety of processes in which material separation is required. Typically, material is fed into a top of the separator and is brought into contact with rotating elements within the separator. Solid material is retained near the center of the separator; while, free liquids are slung off, by centrifugal force, to the outside of the separator. These liquids are then directed to a drain outlet, and the solid material falls, by gravity, to the bottom of the separator from whence it is discharged and collected.

Because of the abrasive quality of the material fed into a separator, and the impact forces which are created as the material is moved through it, components within the separator are subject to reasonably rapid wear. Screens, rotors, etc., all need to be replaced with such frequency, that a separator has a substantial downtime, when necessary maintenance is being performed.

The maintenance problem with centrifugal separators has long been recognized and different measures have been undertaken to address it. In U.S. Pat. No. 4,961,722, for example, a screen assembly is described having separate upper and lower portions. In conventional separators, the screen projects as far upwardly within the separator housing as a flight assembly of the separator. In use, material introduced into the separator is flung against the screen by centrifugal forces. Because of the impact forces of material against the screen, the upper portion of the screen rapidly becomes tom and needs frequent replacement. The separator disclosed in the above noted patent facilitates replacement of the upper part of the screen, where most of the wear occurs, allowing the lower portion of the screen assembly to be used for a longer period of time.

In U.S. Pat. No. 5,256,289, which is incorporated herein by reference, a centrifugal separator is disclosed which includes a pocket assembly below the inlet to the separator and above the screen. The material to be separated is initially flung against the inner surfaces of this pocket assembly, rather than against the screen, to protect the screen from these initial impacts. The material then falls, by gravity, from the pocket into the screen area of the separator where separation occurs. Because the pocket bears the brunt of the initial impact, this separator reduces the wear on the screen assembly, extending the useful life of the screen assembly. Although this separator works well, there are other methods that could be used to help protect and extend the life of the screen assembly of the separator.

SUMMARY OF THE INVENTION

One object of the present invention is to provide an improved vertical centrifugal separator.

Another object is to provide such a separator which will extend the useful life of the screen assembly of the separator.

Another object is to provide an inlet area at the upper or entrance area of the screen which bears the brunt of the initial impact of the materials as they are introduced into the separator to be treated.

These and other objects will become apparent to those skilled in the art in light of the following disclosure and accompanying drawings.

In accordance with the invention, generally stated, a cone frustum is provided for a centrifugal separator. The centrifugal separator includes a frustoconically shaped screen assembly, and a flight assembly mounted inside of the screen assembly and spaced therefrom. The screen assembly and flight assembly are operatively connected to a vertical drive mechanism which rotates the screen assembly and flight assembly independently of each other. An inlet spout allows for the introduction of matter to be separated into the centrifugal separator. The cone frustum is positioned above the flight assembly and below the inlet. The cone frustum has an inner wall spaced slightly radially inwardly from the screen of the screen assembly and radially outwardly of the flight assembly. The cone frustum wall is at an angle from the vertical equal to or less than the angle of the screen from the vertical, but nevertheless at a flaring angle. When matter to be separated is introduced into the separator, the matter is initially flung against the inner surface of the cone frustum. The matter then drops slowly and gradually onto the flight assembly, having gravity overtaking the generated centrifugal forces to achieve a movement of the matter to the screen. The cone frustum thus protects the portion of the screen which wears most quickly, extending the useful life of the complete screen assembly. The cone frustum may be provided with holes or other openings to flow for some preliminary dewatering of the material introduced into the separator.

DESCRIPTION OF THE PREFERRED EMBODIMENTS

Figure 1:
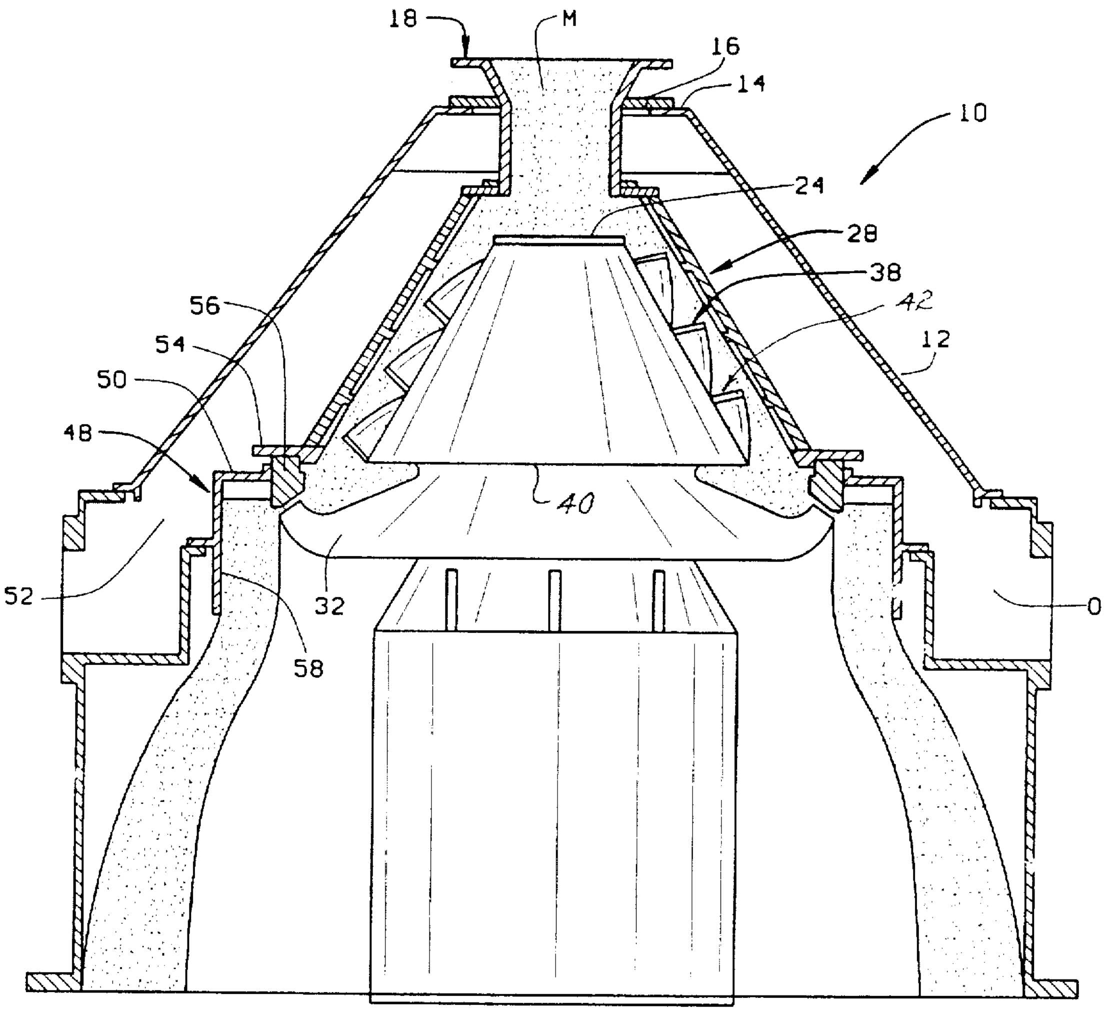
FIG. 1 PRIOR ART
FIG. 1 is a cross-sectional view of a prior art centrifugal separator.
Figure 2:
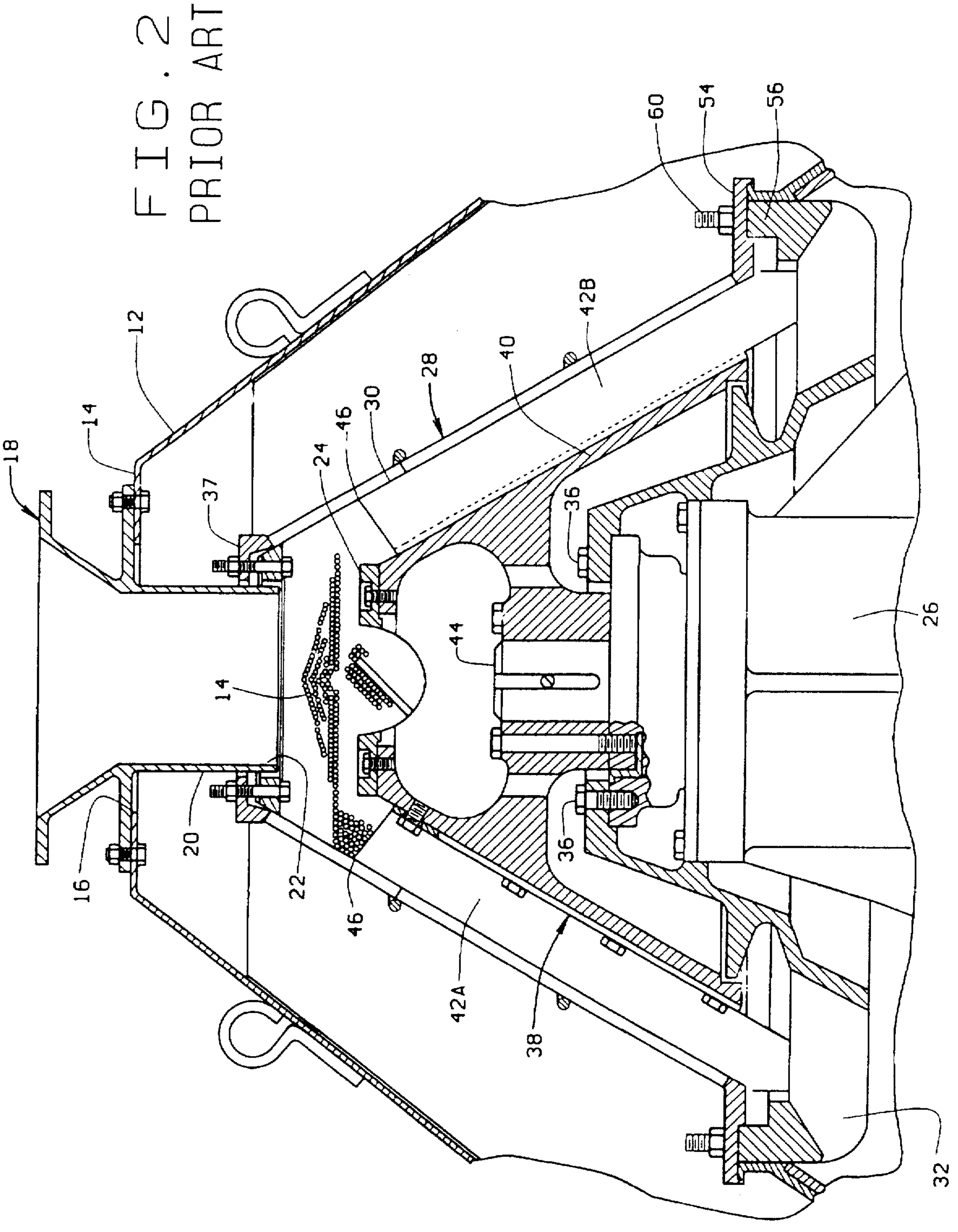
FIG. 2 PRIOR ART
FIG. 2 is an enlarged cross-sectional view of the prior art separator.

A prior art vertical centrifugal separator 10 is shown generally in FIGS. 1 and 2. The separator 10 includes a frustoconical outer housing 12 having a top or face plate 14. The top plate 14 has an opening 16 in which is fitted an :inlet assembly 18 by which material M to be separated is fed into the separator. The inlet assembly 18 is bolted to the top plate 14 and has a vertical spout 20 extending down inside the housing. Positioned beneath an outlet 22 of the spout is a plate 24 which is rotated via a drive assembly 26. Material falling though the inlet strikes the rotating plate 24 is thrown off the plate by centrifugal force. A screen assembly 28 comprises a perforated screen 30 attached to a rotor 32. The screen assembly 28 is frustoconical in shape and is connected at its lower end to the rotor. The rotor is connected to the drive assembly 26 by bolts 36, for the screen assembly to be rotated by the drive assembly. At its upper end, screen 30 is clamped by a screen clamp ring 37.

A flight assembly 38 comprises a hollow frustum of a flight circular cone 40. A plurality of flights 42 (FIG. 1 ) are attached to the outer surface of the cone and extend around the cone in a vertical, spiraling fashion. Two flights 42*a* and 42*b* are shown in FIG. 2. The flight assembly 38 is mounted within housing 12, inside the screen assembly 28, and is attached to a drive shaft 44 of the drive assembly 26. The flight assembly is therefore also rotatably driven by the drive assembly, although at a different speed than the screen assembly. As seen in FIG. 2, screen 30 extends upwardly above the plate 24 to outlet 22 of the inlet assembly. The outer tip ends 46 of the flights 42*a* and 42*b* extend slightly above the height of the plate. The plate 24 is attached to the upper end of the supporting cone 40.

At the base of the housing 12, a baffle assembly 48 (FIG. 1) includes a circumferential baffle 50 which is spaced inwardly from the side wall of the housing so a circumferential opening 52 is formed therebetween. At the base of the screen assembly 28 is a horizontal, circumferential flange 54 which is secured to the rim 56 by radially extending vanes or spokes of the rotor 32, as by bolts 60. Because the vanes 56 are circumferentially spaced about the rotor, arcuate openings are formed therebetween. Lastly, baffle 50 has an inner wall 58 which defines an outlet for the separated material.

In operation, material M, which typically consists of solid matter (such as coal) and free liquid, falls by gravity through the inlet assembly 18 onto the plate 24. The material is flung off the plate by centrifugal force and impacts the screen 30. Some of the material strikes the upper tip ends of the flights. In either event, the material falls between the screen and flight assemblies. As the material falls, by gravity, down the flights 42, the free liquid is slung outwardly, by centrifugal force, and forced through the openings in the screen, and strikes the inside of the housing 12. The liquid cascades down the housing wall and flows out through the opening O between the housing and the baffle 50. Meantime, the remaining material falls off the bottom of the flight assembly 38 and between the vanes in the rotor assembly 32 to the bottom of the housing. A conveyor belt (not shown) or other collection mechanism, is located at the base of the housing below the separator 10 to collect the now separated material and to move the material to the next station.

From the foregoing, it will be appreciated that there are many points within the separator 10 at which wear, impact damage, etc. cant occur so that components of the separator 10 at which wear, impact damage, etc. can occur need to be frequently replaced. For example, the upper end of the screen is subject to a constant barrage of material which rend the screen. The upper, tip ends of the flights are also subject to constant impacts. Because the screen and flight assemblies typically rotate at different speeds, the vanes 56 of the rotor continually strike material filling off the lower end of the flight assembly. In addition, when the vanes strike the material, they knock it against the wall 58. To replace these various worn and damaged separator components takes time, and the overall replacement cost for these items becomes relatively expensive.

Figure 4:
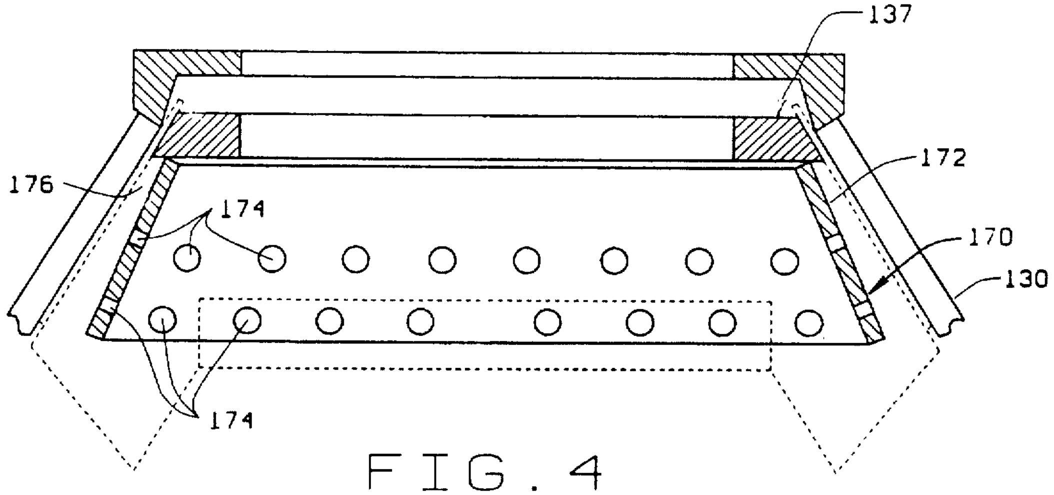
FIG. 4 is a cross-sectional view of a cone frustum for use with the separator of FIG. 3.
Figure 3:
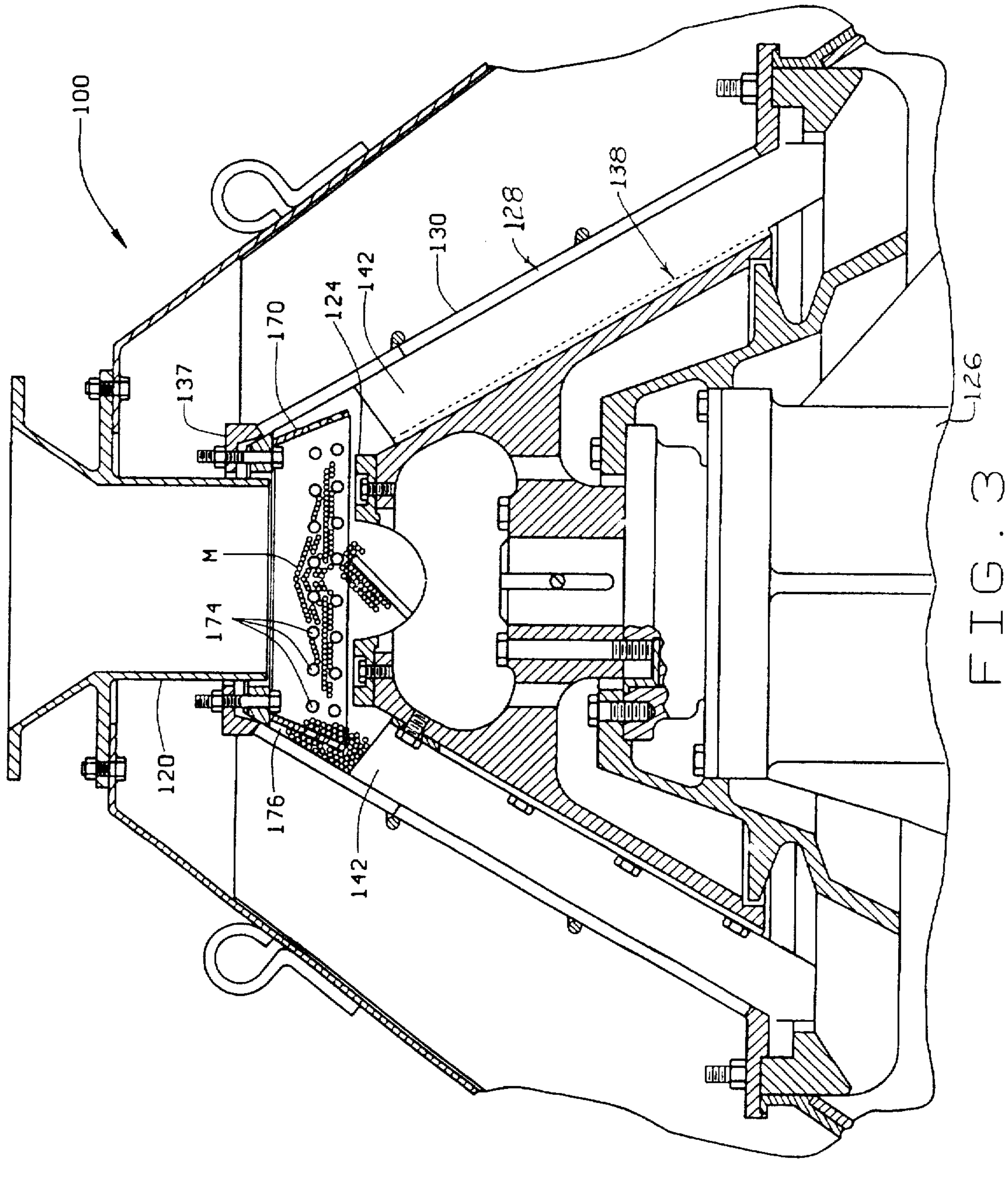
FIG. 3 is a cross-sectional view of a centrifugal separator of the present invention.

An improved separator 100 of the present invention is shown in FIG. 3. This is a vertical centrifugal separator. The separator of FIG. 3 is substantially the same as the prior art separator of FIGS. 1 and 2. However, separator 100 includes a cone frustum 170 secured to the screen clamp ring 137 and positioned beneath spout 120 and above plate 124. The plate 124 is provided at the upper end of the drive assembly 126 and its supported flight assembly 138. The cone frustum 170, shown in enlarged detail in FIG. 4, has a side wall 172 with a plurality of openings 174 framed therein. The openings 174 are shown formed in two rows evenly spaced apart, but could be placed in the frustum in most any pattern. The angle of the frustum may be equal to the angle of the screen 130, but is preferably less than the angle of the screen. The frustum 170 has a diameter at its bottom larger than plate 124, such that the bottom of the wall 172 extends over the flights 142.

As is known, the screens in screen-scroll machines, such as separator 10, have high wear areas just above the flight tips. Because there is excessive wear in this area, this small area determines the screen life. Stated differently, the remainder of the screen may have wear life remaining, but the screen must be changed when the screen area just above the flight tips wears. Excessive abrasive wear occurs at the flight tips because the screen is used as an accelerator for the materials M being fed into the separator. When the cone frustum 170 is used, the frustum takes the primary wear, and shields the screen at the flight tips from the excessive wear otherwise caused. It has been found that the use of cone frustum 170 can increase the screen life by two to five times. Although the angle of the cone frustum may be equal to that of the separator screen 130, its angle is preferably smaller. With the smaller angle, the cone frustum holds the material while accelerating the material to the separator speed, and allows the material to gently drop onto the screen surface. The material is guided downwardly toward the flight and outwardly towards the screen the flare of the cone frustum. As can be appreciated, the gravitational or downward component of the forces acting on the material, help in part to drop the material onto the surface of the screen.

The holes 174 in the cone frustum allows for preliminary dewatering of the material. That is, some of the water will be removed from the material before the material is dropped onto the screen 130. This preliminary dewatering reduces screen wear that normally takes place where the largest volume of water discharge carries fine solids though the screen. Because excessive screen wear occurs where water and solids discharge, preliminary dewatering reduces screen wear. The cone frustum 170 can be placed next to the screen, but is preferably spaced inwardly slightly from the screen. This spacing allows for some material to accumulate in the space 176 between the cone frustum 170 and the screen 130 and allows for the preliminary dewatering.

As variations within the scope of the appended claims may be apparent to those skilled in the art, the foregoing description is set forth only for illustrative purposes and is not meant to be limiting. For example, although the inner surface of cone frustum 170 is shown to be generally smooth and unbroken except for the holes 174, the cone frustum 170 may include vanes extending along the inner surface of the cone frustum 170 from the top o the bottom of frustum wall 172. This example is merely illustrative.

We claim:

1. A centrifugal separator comprising:

a drive mechanism including a drive shaft rotatable about a axis which the centrifuge rotates;

a flight assembly attached to the drive shaft and rotatably driven thereby, said flight assembly having an end, and a plate secured at the end of said flight assembly;

a screen assembly connected to the drive mechanism to be rotatably driven thereby, the screen assembly including a perforated screen installed radially outwardly of the flight assembly;

an inlet positioned adjacent said flight assembly for introducing material onto said plate and delivering said introduced material into a space between the screen and the flight assembly for separating fluids from the introduced material;

the improvement comprising a hollow cone frustum open at its ends, positioned radially inward from said screen assembly between said inlet and said flight assembly and operatively connected to said drive mechanism to be rotated thereby, such that material introduced into said centrifugal separator and onto said plate is initially flung against said cone frustum to shield an area of the screen adjacent said flight assembly from said material, said material being moved slowly onto said flights due to generated centrifugal forces and gravity for delivery of said material along said cone frustum, said screen having an angle of inclination flaring outwardly with respect to the axis of said flight assembly, and said cone frustum has an angle of inclination equal to or less than the angle of said screen, wherein said cone frustum has a diameter less than that of the screen, to form a space between said screen and said cone frustum.

2. The improvement of claim 1 wherein said cone frustum has an angle less than the angle of the screen.

3. The improvement of claim 1 wherein said cone frustum includes means for dewatering said material while it is in said cone frustum.

4. The improvement of claim 3 wherein said dewatering means includes a plurality of openings formed in said cone frustum.

5. The improvement of claim 1 wherein said separator includes a screen clamp ring, said cone frustum being secured to said screen clamp ring.

6. A hollow cone frustum in combination with a centrifugal separator, the separator having an in;et, a rotating flight assembly and a rotating screen assembly spaced from said rotating flight assembly, said rotating screen assembly extending within the separator adjacent the flight assembly, said hollow cone frustum being positioned in said separator to receive material introduced into said separator before said material impacts said screen and flight assemblies, said cone frustum arranged radially inwardly from said screen assembly, said cone frustum being open at its ends and including a frustoconical wall having a plurality of openings formed therein to provide for initial separation of material introduced into the centrifugal separator.

7. The cone frustum of claim 6 wherein said openings are evenly spaced about said cone frustum.

8. The cone frustum of claim 7 wherein said openings are formed in rows.

* * * * *

UNITED STATES PATENT AND TRADEMARK OFFICE

CERTIFICATE OF CORRECTION

PATENT NO. : 5,558,770

DATED : September 24, 1996

INVENTOR(S) : Dewey M. Cope; Thomas J. Magrecki.

It is certified that error appears in the above-indentified patent and that said Letters Patent is hereby corrected as shown below:

Column 6, claim 6, line 6, change "in;et" to ---inlet---.

Signed and Sealed this

Tenth Day of December, 1996

Attest:

Bruce Lehman

BRUCE LEHMAN

*Attesting Officer*

*Commissioner of Patents and Trademarks*